(12) United States Patent
Nakashima et al.

(10) Patent No.: US 7,540,343 B2
(45) Date of Patent: Jun. 2, 2009

(54) FUEL CELL VEHICLE

(75) Inventors: Akira Nakashima, Shioya-gun (JP); Tohru Ono, Kawachi-gun (JP); Daisuke Tsurumaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 392 days.

(21) Appl. No.: 11/428,698

(22) Filed: Jul. 5, 2006

(65) Prior Publication Data

US 2007/0007054 A1    Jan. 11, 2007

(30) Foreign Application Priority Data

Jul. 8, 2005  (JP) ............................ 2005-200189
Jul. 8, 2005  (JP) ............................ 2005-200190
Jul. 8, 2005  (JP) ............................ 2005-200191

(51) Int. Cl.
*B60K 1/00*    (2006.01)
(52) U.S. Cl. .................. 180/65.1; 180/65.2; 180/65.3; 180/68.5; 296/193.07
(58) Field of Classification Search ................ 296/193, 296/193.07; 248/430; 297/344.1; 180/65.1, 180/65.3, 65.5, 68.5
See application file for complete search history.

(56) References Cited

U.S. PATENT DOCUMENTS

| | | | | |
|---|---|---|---|---|
| 4,402,545 A | * | 9/1983 | Utsunomiya et al. | ........ 296/204 |
| 6,190,793 B1 | * | 2/2001 | Barton et al. | ................. 429/34 |
| 6,908,145 B2 | * | 6/2005 | Joaquin et al. | ......... 296/193.07 |
| 7,303,211 B2 | * | 12/2007 | Borroni-Bird et al. | ....... 280/831 |
| 2005/0103968 A1 | * | 5/2005 | Yamada et al. | .............. 248/429 |
| 2005/0263332 A1 | * | 12/2005 | Chernoff et al. | ........... 180/65.1 |
| 2006/0021805 A1 | | 2/2006 | Yamashita | |

FOREIGN PATENT DOCUMENTS

JP    2004-122971    4/2004

* cited by examiner

*Primary Examiner*—Christopher P Ellis
*Assistant Examiner*—Bryan A Evans
(74) *Attorney, Agent, or Firm*—Rankin, Hill & Clark LLP

(57) ABSTRACT

A fuel cell vehicle includes: a vehicle body; a floor panel provided in the vehicle body that has a floor tunnel that bulges in substantially a center in the width direction of the vehicle body; a pair of front seats each having a seating surface and a seat back and disposed on the floor panel outside of the floor tunnel in the width direction of the vehicle body; seat rails provided between the front seats and the floor panel and adapted to be able to move the front seats in the longitudinal direction of the vehicle body; and a fuel cell stack having a plurality of unit fuel cells stacked in the longitudinal direction of the vehicle body, being disposed under the floor tunnel so as to be substantially parallel with the seat rails.

17 Claims, 7 Drawing Sheets

FUEL CELL VEHICLE

BACKGROUND OF THE INVENTION

1. Field of the Invention

The present invention relates to a fuel cell vehicle.

Priority is claimed on Japanese Patent Applications No. 2005-200189, No. 2005-200190, and No. 2005-200191 filed Jul. 8, 2005, the contents of which are incorporated herein by reference.

2. Description of Related Art

There has conventionally been proposed a fuel cell vehicle in which the fuel cell stack is mounted in the vehicle cabin (the space for the occupants) to prevent exposure of the fuel cell to dirt and water splash and spray and improve access for maintenance (see, for example, Japanese Unexamined Patent Application, First Publication No. 2004-122971).

However, when the fuel cell stack is thus disposed in the space for the occupants, a partitioning member becomes necessary to isolate the fuel cell stack from the occupant space in order to prevent the occupants from coming into contact with the fuel cell stack. This leads to an increase in the vehicle weight. Also, in the case of a fuel cell vehicle, in addition to ordinary collision safety measures for a vehicle, various measures must be taken to protect the fuel cell stack. When the fuel cell stack is disposed in the vehicle cabin, components of various kinds are required to protect the fuel cell stack, leading to a problem in that the occupant space in the cabin becomes cramped.

SUMMARY OF THE INVENTION

The present invention was made in view of the aforementioned circumstances, and has as an object to provide a fuel cell vehicle in which the fuel cell stack is disposed outside of the vehicle cabin while protecting the fuel cell stack.

A first aspect of the present invention is a fuel cell vehicle including: a vehicle body; a floor panel provided in the vehicle body that has a floor tunnel that bulges in substantially a center in the width direction of the vehicle body; a pair of front seats each having a seating surface and a seat back and disposed on the floor panel outside of the floor tunnel in the width direction of the vehicle body; seat rails provided between the front seats and the floor panel and adapted to be able to move the front seats in the longitudinal direction of the vehicle body; and a fuel cell stack having a plurality of unit fuel cells stacked in the longitudinal direction of the vehicle body, being disposed under the floor tunnel so as to be substantially parallel with the seat rails.

The seat rails may be disposed at substantially the same height as the center of gravity of the fuel cell stack.

The fuel cell vehicle of the present invention may further include an end plate provided on one end of the fuel cell stack in the stacking direction, wherein the fuel cell stack is disposed so that the end plate and the seat rails overlap in the longitudinal direction.

The length of the fuel cell stack in the longitudinal direction of the vehicle body may be longer than the length of the fuel cell stack in the width direction of the vehicle body.

The fuel cell vehicle of the present invention may further include an auxiliary component of the fuel cell stack provided behind the fuel cell stack with respect to the vehicle body.

The front end portion of the seat rails may be disposed to be higher than a rear end portion thereof.

The fuel cell vehicle of the present invention may further include a reinforcement frame provided on a side surface of the floor tunnel.

The reinforcement frame may be provided at substantially same height as the upper end of the side surface of the floor tunnel.

The fuel cell vehicle of the present invention may further include a transmission member that couples the side surfaces of the floor tunnel in the width direction of the vehicle body.

The transmission member may be provided at a higher position than the seating surface.

The transmission member may be provided at a side of each of the seat back.

The transmission member may be disposed at a rearward position of the vehicle body than the fuel cell stack.

A cross beading may be used as the transmission member.

The floor tunnel may have a shape that is highest at the sides of the seat backs, and the transmission member may be provided on top of the floor tunnel at the sides of the seat backs.

The floor tunnel may have a shape in which a portion positioned to the side of the seat backs is the highest.

A second aspect of the present invention is a fuel cell vehicle including: a vehicle body; a floor panel provided in the vehicle body that has a floor tunnel that bulges in substantially a center in the width direction of the vehicle; a pair of front seats each having a seating surface and a seat back and disposed on the floor panel outside of the floor tunnel in the width direction of the vehicle body; seat rails provided between the front seats and the floor panel and constituted to be able to move the front seats in the longitudinal direction of the vehicle body; a transmission member that connects the side surfaces of the floor tunnel in the width direction of the vehicle body; and a fuel cell stack having a plurality of unit fuel cells stacked in the longitudinal direction of the vehicle body, being disposed under the floor tunnel.

A third aspect of the present invention is a fuel cell vehicle including: a vehicle body; a floor panel provided in the vehicle body that has a floor tunnel that bulges in substantially a center in the width direction of the vehicle; a pair of front seats having a seating surface and a seat back and disposed on the floor panel outside of the floor tunnel in the width direction of the vehicle body; seat rails provided between the front seats and the floor panel and constituted to be able to move the front seats in the longitudinal direction of the vehicle body; a reinforcement frame provided on the side surfaces of the floor tunnel; and a fuel cell stack having a plurality of unit fuel cells stacked in the longitudinal direction of the vehicle body, being provided under the floor tunnel.

DETAILED DESCRIPTION OF THE INVENTION

Figure 1:
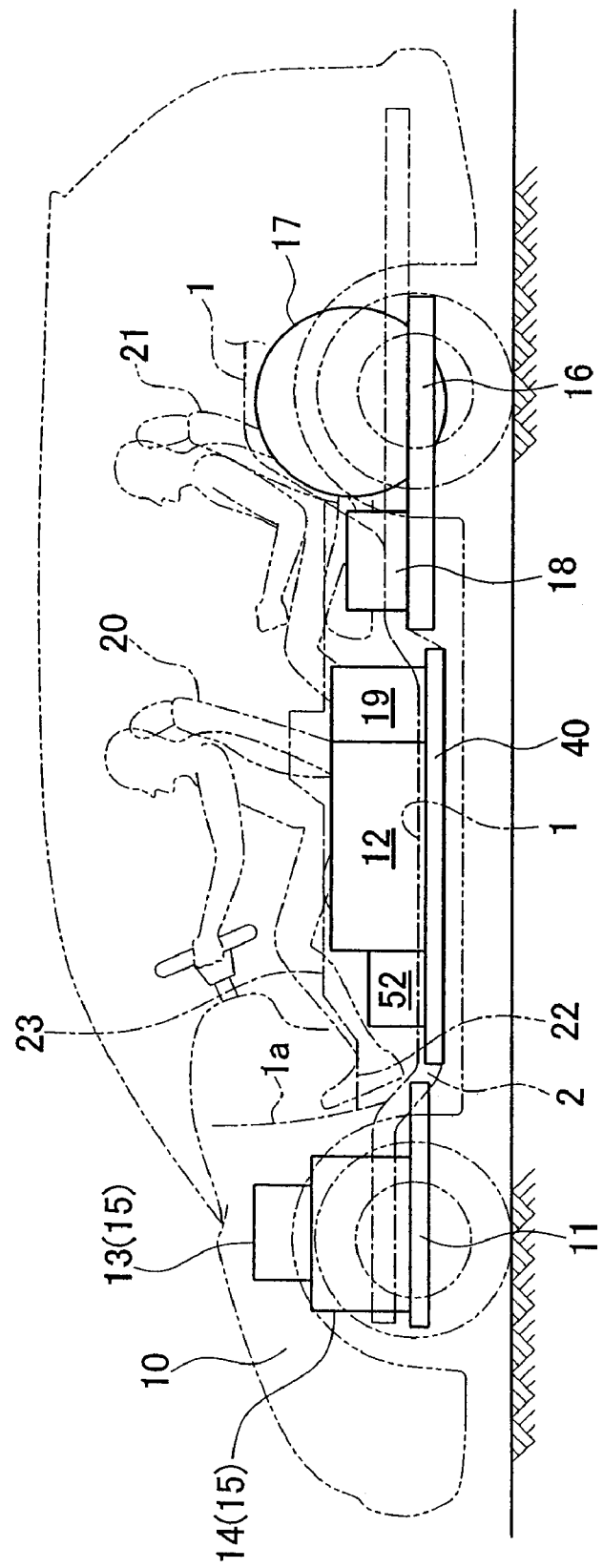
FIG. 1 is a side view of a vehicle according to an embodiment of the present invention.
Figure 2:
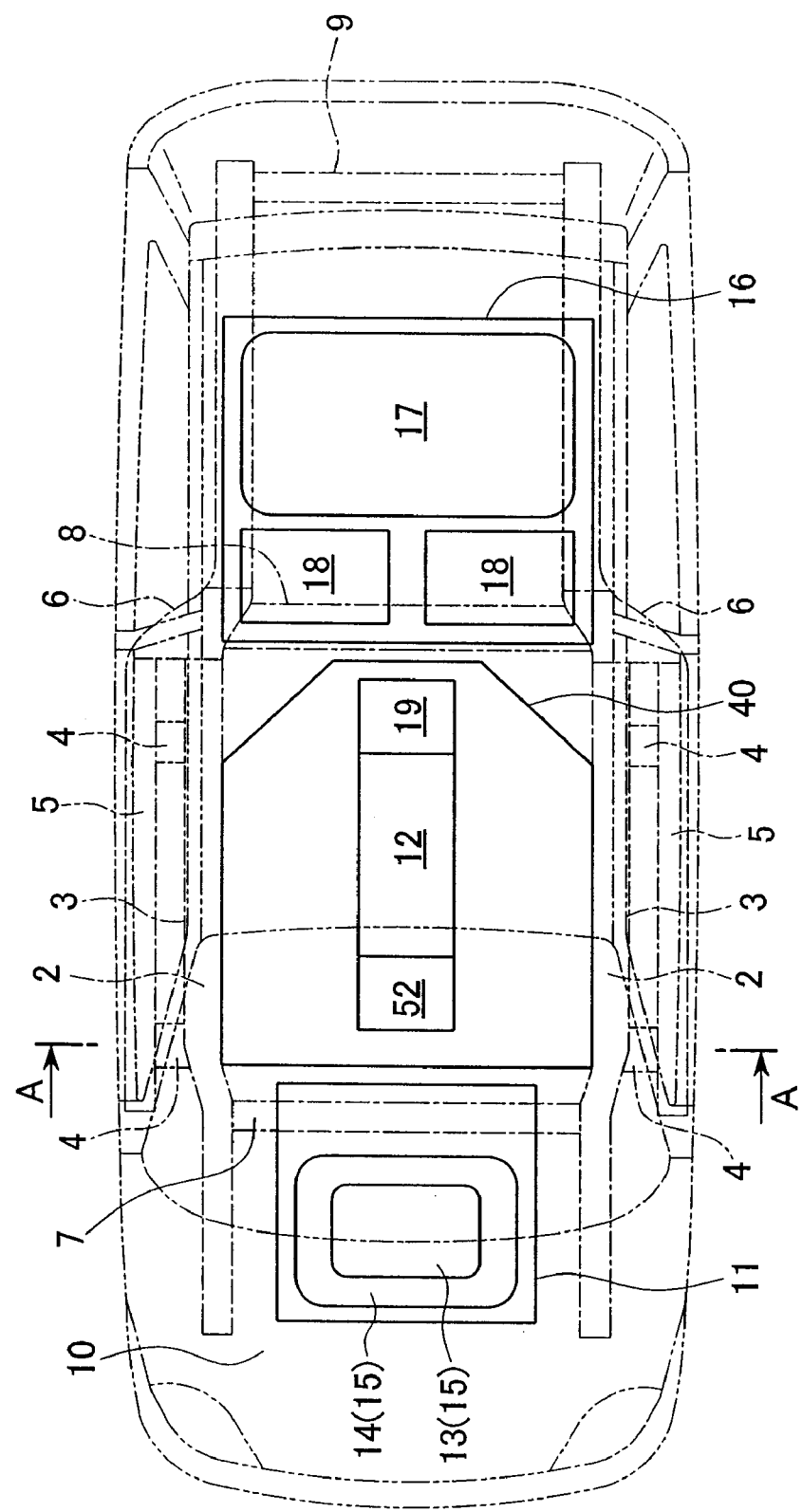
FIG. 2 is a plan view of the vehicle of the present embodiment.
Figure 3:
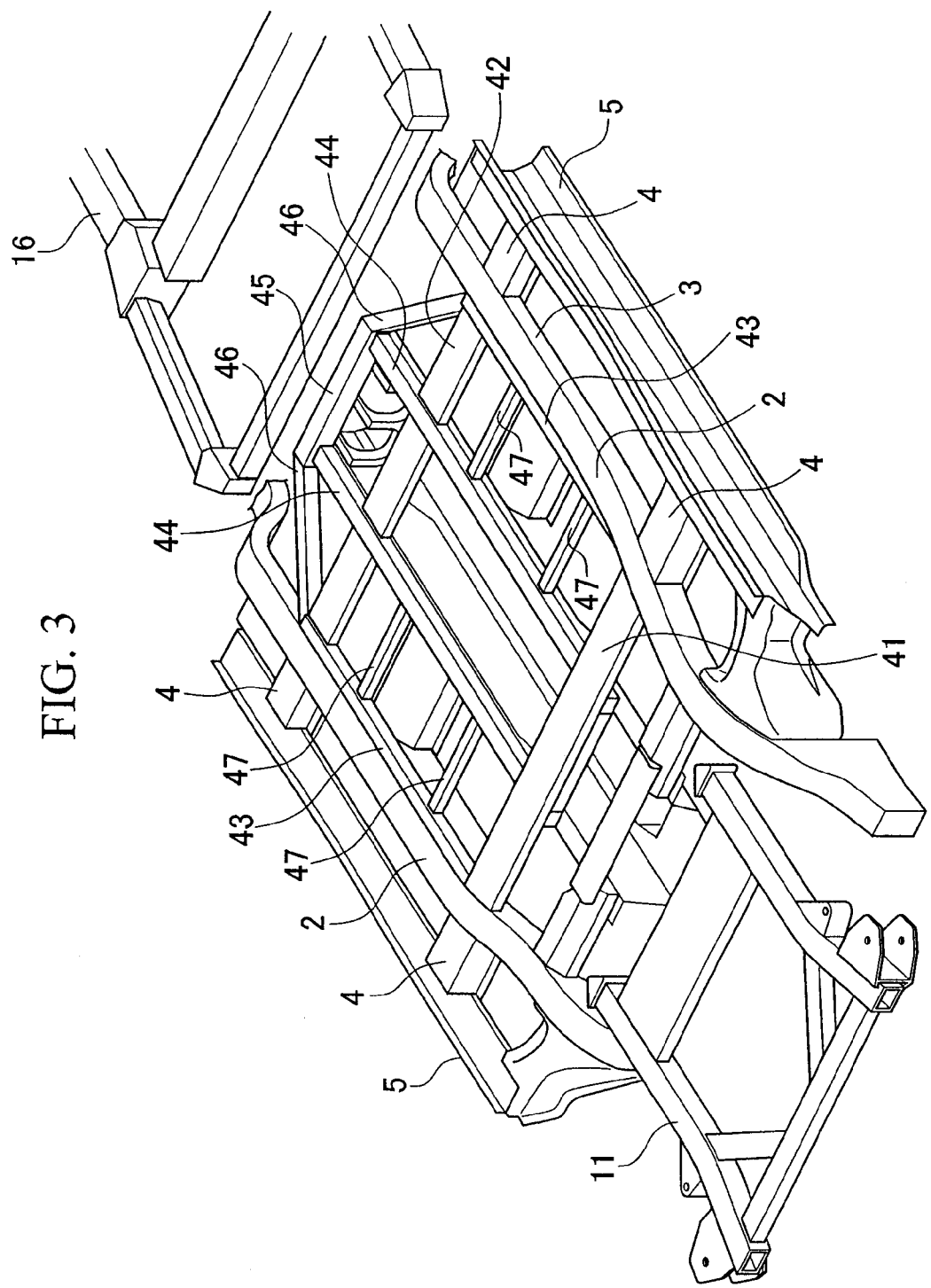
FIG. 3 is a perspective view from the under side of the vehicle of the present embodiment.

An embodiment of the present invention shall be described below with reference to the accompanying drawings.

As shown in FIGS. 1 to 4, the fuel cell vehicle has mounted under the floor of the vehicle body a fuel cell stack 12 that generates electricity by the electrochemical reaction between hydrogen and oxygen. The fuel cell vehicle travels by driving a drive motor 14 with electrical power generated by the fuel cell stack 12. The fuel cell stack 12 is a well-known solid polymer electrolyte membrane fuel cell (PEMFC) including a plurality of stacked unit cells. Hydrogen gas is supplied to the anode side as fuel gas, and air including oxygen is supplied to the cathode side as oxidizing gas. Water is produced as a byproduct of generating electrical power by the electrochemical reaction.

Provided in the fuel cell vehicle are a pair of left and right side frames 2 forming the vehicle body skeleton member under a floor panel 1 from the vehicle body front portion to the vehicle body rear portion. A side sill 5 is joined via outriggers 4 to an outside wall 3 of each of the side frames 2. The rear end portion of each side sill 5 is connected so as to merge with the rear portion of the side frame 2 via an extension 6.

Cross members 7, 8, and 9 that are the vehicle body skeleton members in the vehicle body width direction are coupled to the side frames 2.

A front sub-frame 11 is provided in a motor room 10 at the vehicle body front portion, and here is provided a pump motor unit 15 which includes a compressor 13 that feeds air to the fuel cell stack 12 and the drive motor 14 for traction.

A rear sub-frame 16 which is integrally equipped with wheels and a suspension which are not illustrated is attached to the side frames 2 from below at the vehicle body rear portion. A hydrogen tank 17 that stores hydrogen, which serves as the fuel of the fuel cell stack 12, and a storage battery 18 are attached to the rear sub-frame 16.

The floor panel 1 is joined to regions between the side sills 5 on the side frames 2 thus constituted. The front end portion of the floor panel 1 continues into a dash lower 1a rising up at the front side, and the rear end portion of the floor panel 1 extends until a position covering the top portion of the hydrogen tank 17 on the rear sub-frame 16.

A floor tunnel 22 that bulges upward is formed in the floor panel 1 between left and right front seats 20 and a rear seat 21, extending from the lower end portion of the dash lower 1a to the vehicle body rear portion.

A center console 23 that bulges upward is formed at the floor tunnel 22, extending in the longitudinal direction of the vehicle between the left and right front seats 20.

Figure 4:
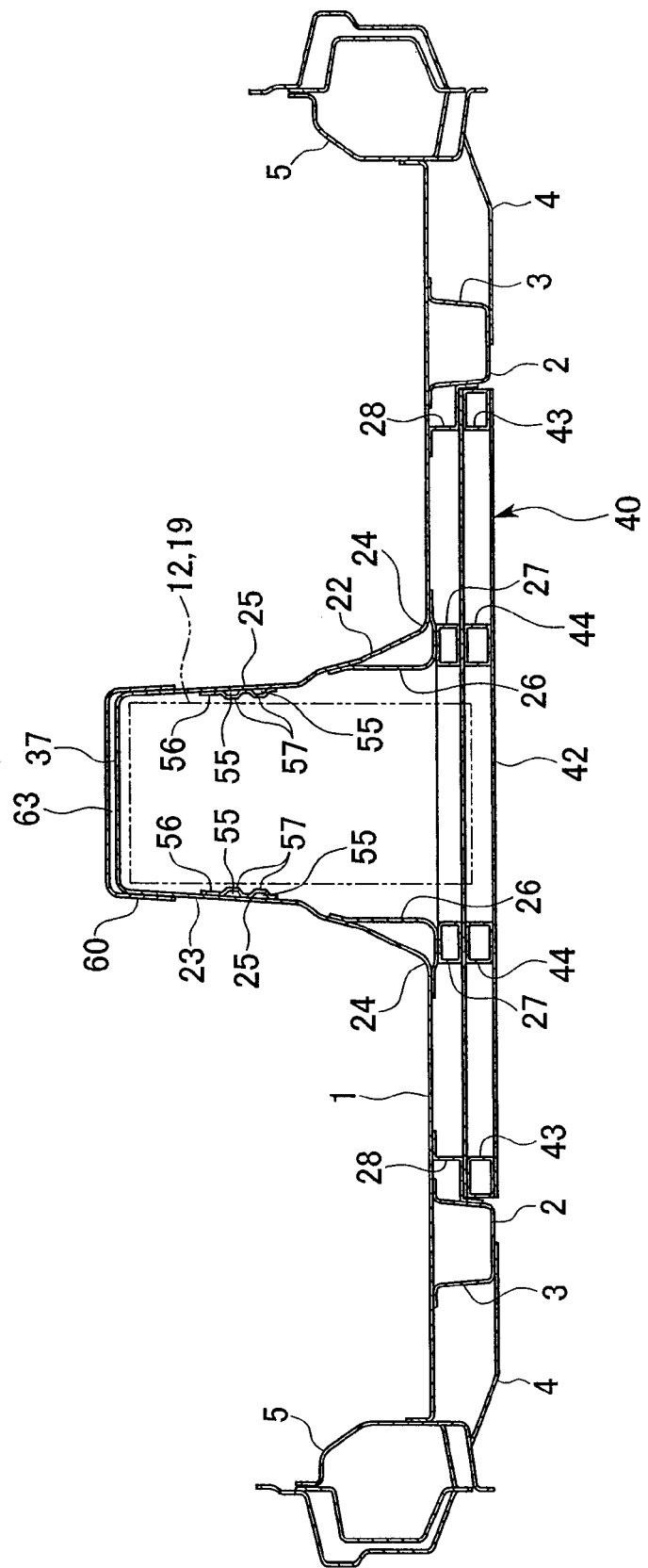
FIG. 4 is a cross-sectional view of the floor panel taken along the line A-A in FIG. 2.

As shown in FIG. 4, reinforcements 26 forming a triangular cross section are joined to the undersurface regions from the left and right rising portions 24 of the floor tunnel 22 to the side walls (side surfaces) 25 thereof, reinforcing the floor tunnel 22 and the center console 23. Center frames 27 with a closed cross section structure are joined to the lower surface of each reinforcement 26 along the longitudinal direction of the vehicle, and reinforcement frames 28 with a closed cross section structure along the vehicle body longitudinal direction are joined to the corner portion formed by the inside wall of the side frames 2 and the floor panel 1. A sub-frame 40 is attached to the lower surface of the center frames 27 and the reinforcement frames 28. The fuel cell stack 12 and auxiliary components 19 mounted on this sub-frame 40 are disposed in the floor tunnel 22, i.e., under the floor panel 1 which is outside the vehicle cabin. Such a constitution can thus isolate the fuel cell from the space for the occupants by the floor panel 1 (floor tunnel 22).

Figure 5:
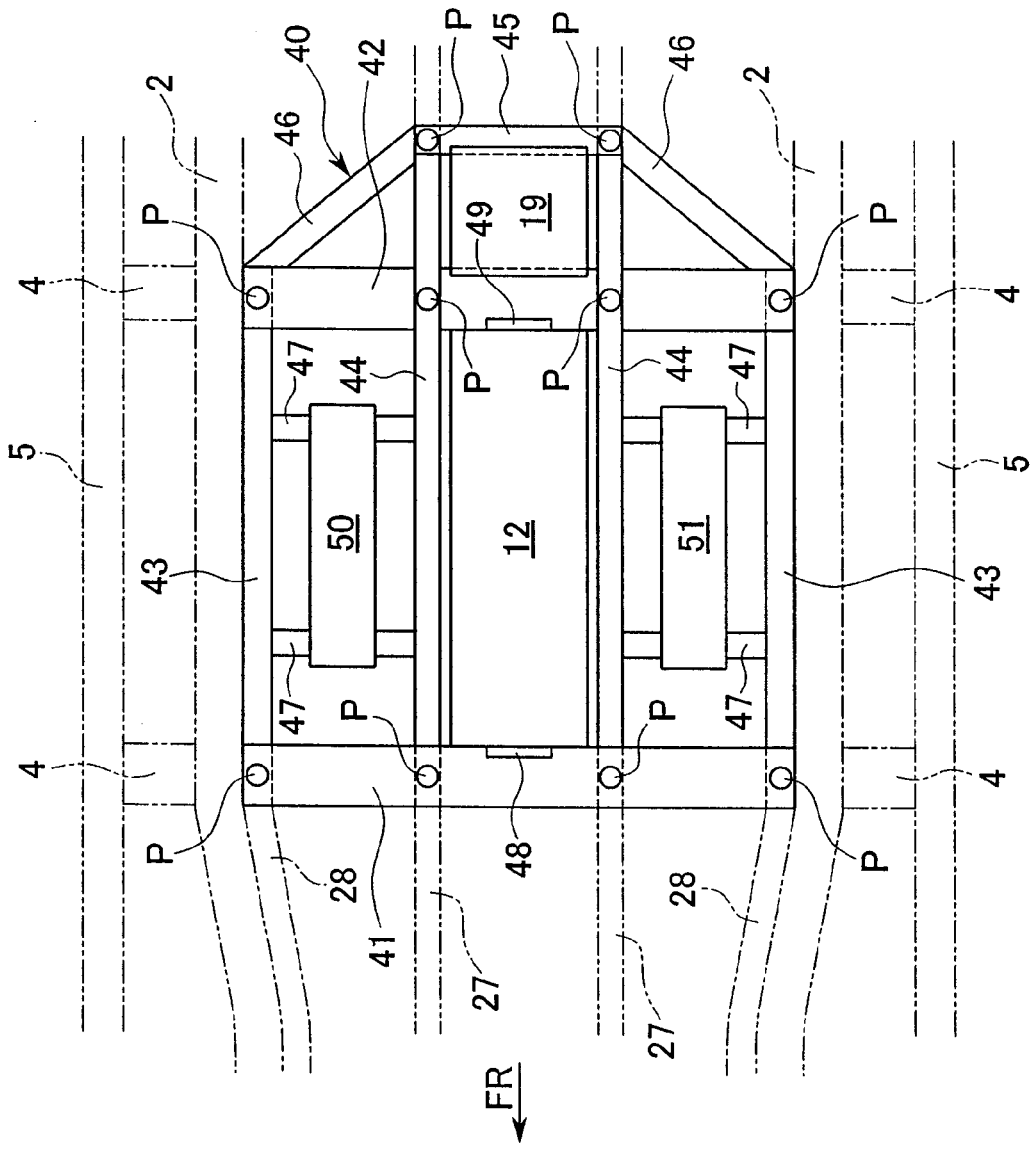
FIG. 5 is a plan view of the sub-frame of the present embodiment.

As shown in FIG. 5, the sub-frame 40 is provided with a front sub-cross frame 41 and a rear sub-cross frame 42 that are disposed at positions corresponding to the outriggers 4 and extend in the vehicle width direction. Provided between the front and rear sub-cross frames 41 and 42 are sub-side frames 43 that connect to the right and left end portions of the sub-cross frames 41 and 42. These sub-side frames 43 are disposed along the inside wall of the side frames 2 and under the reinforcement frames 28. In FIG. 5, FR denotes the front.

Disposed to the inside of each sub-side frame 43 are sub-center frames 44 positioned under the center frames 27 along the longitudinal direction of the vehicle. The front end portion of each sub-center frame 44 is joined to the front sub-cross frame 41, and the rear end portion of each sub-center frame 44 is joined to the rear sub-cross frame 42, with the sub-center frames 44 extending further to the rear than the rear sub-cross frames 42. The rear end portions of the sub-center frames 44 are linked by an end pipe 45 disposed in the vehicle width direction, and the left and right end portions of the end pipe 45 and the left and right end portions of the rear sub cross frame 42 are joined by gusset pipes 46 that are obliquely disposed.

Intermediate pipes 47 are connected at a specified interval at the front side and rear side between each sub-center frame 44 and sub-side frame 43.

The fuel cell stack 12 is disposed between the sub-cross frames 41 and 42, between the sub-center frames 44 of the sub-frame 40. The fuel cell stack 12 is fixed to the sub-frame 40 via brackets 48 and 49 that are fixed to the front and rear sub-cross frames 41 and 42. Also, the auxiliary components 19 of the fuel cell stack 12 are disposed between the sub-center frames 44, between the end pipe 45 and the rear sub-cross frame 42.

Figure 6:
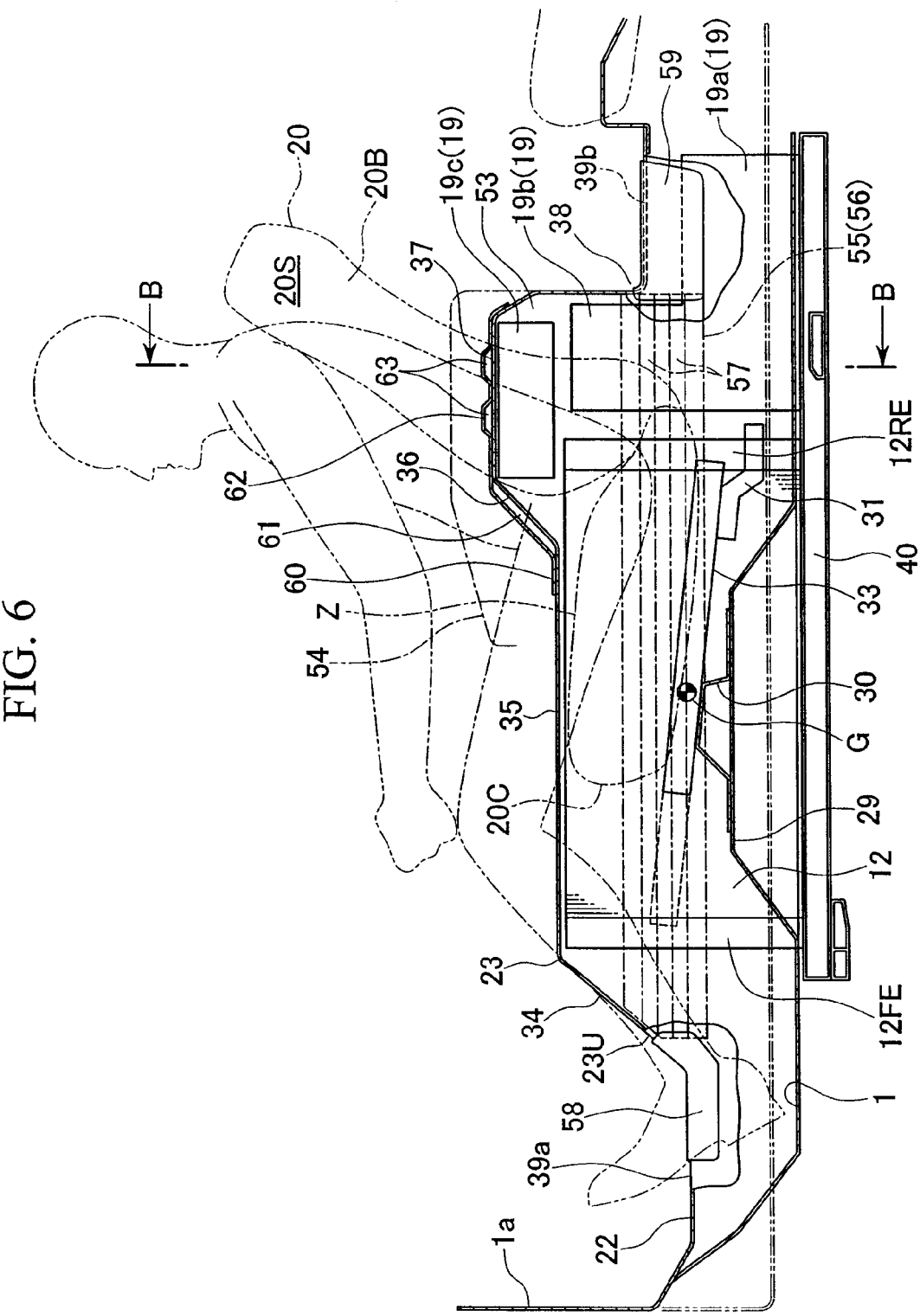
FIG. 6 is a main portion enlarged cross section of FIG. 1.

Specifically, as shown in FIG. 6, the auxiliary components 19 include oxygen system components 19a, hydrogen system components 19b, and an electronic control unit (ECU) 19c that controls the system of the fuel cell stack 12, which are disposed in that order from the under surface of the vehicle body.

A DC-DC converter 51 is mounted between the front and rear intermediate pipes 47 on the left side, and a heater 50 is mounted between the intermediate pipes 47 on the right side. A contactor box 52 is disposed in front of the fuel cell stack 12, i.e., at the front end side of the floor tunnel 22. This contactor box 52 is, for example, directly fixed to a support frame not illustrated that is provided across both center frames 27 just before the sub-frame 40 without being mounted on the sub-frame 40 (see FIG. 2).

Attachment points P for the reinforcement frames 28 of the vehicle body side frames are set at the joint of the sub-side frames 43 and the front and rear sub-cross frames 41 and 42, attachment points P for the center frames 27 are set at the joint of the sub-center frames 44 and the front and rear sub-cross frames 41 and 42, and at the joint of the end pipe 45, the gusset pipes 46, and the sub-center frames 44. The sub-frame 40 is fixedly fastened from below by bolts and nuts to the center frames 27 and the reinforcement frames 28 of the vehicle body at these 10 attachment points P, so as to be housed within the vertical width dimension of the side frames 2.

Figure 7:
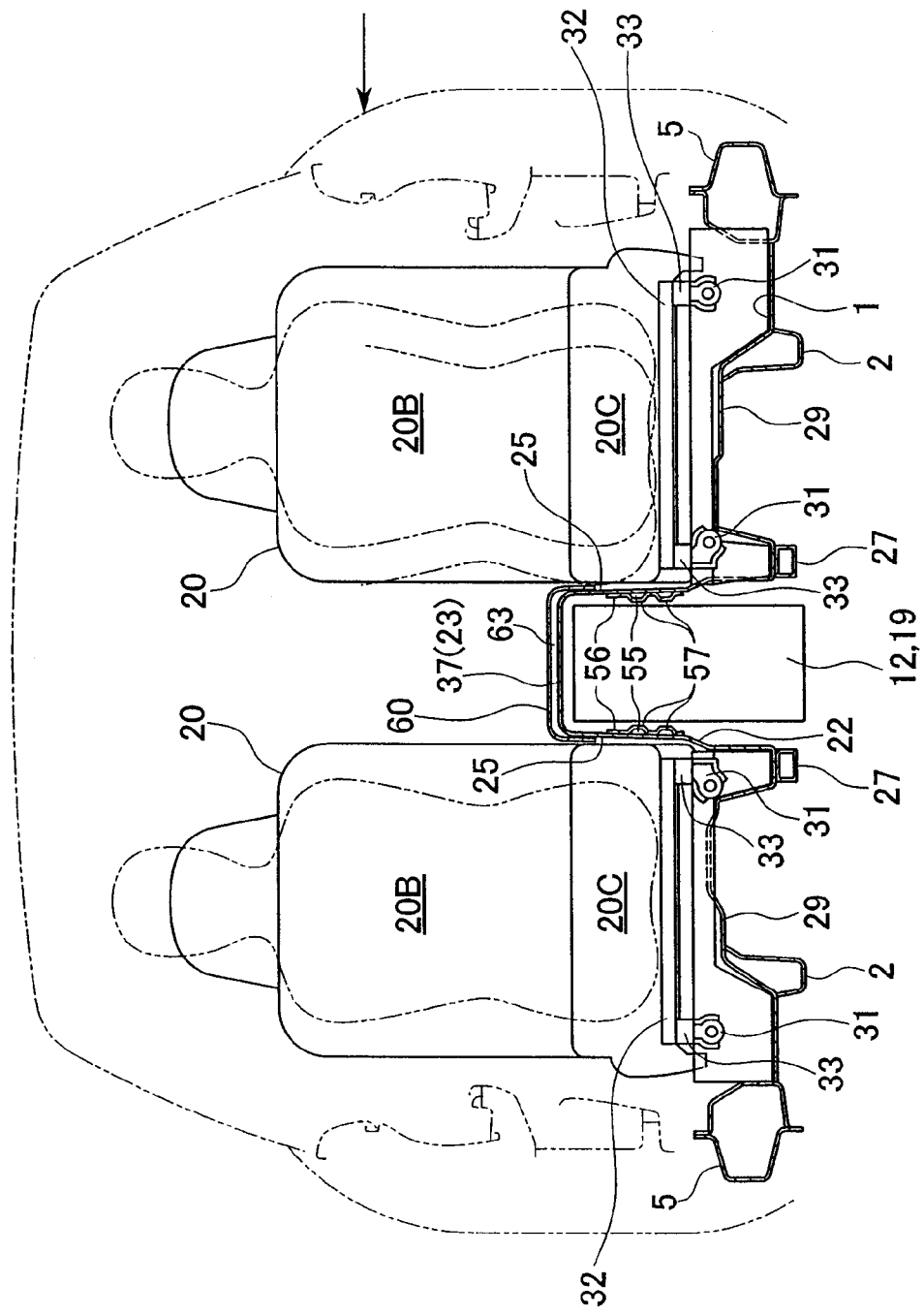
FIG. 7 is a cross-sectional view taken along the line B-B in FIG. 6.

As shown in FIGS. 6 and 7, a seat supporting portion 29 that bulges upward is formed on the left and right of the floor panel 1 under the front seats 20, and a crest-shaped cross-sectional front-side seat bracket 30 is attached thereto. A crank-shaped rear-side seat bracket 31 that descends toward the rear is attached to the floor panel 1 surface positioned to the rear of the seat supporting portion 29. Meanwhile, a seat frame 32 is provided at the reverse side of a seat cushion 20C of each front seat 20. Seat rails 33 that can move the front seat 20 in the longitudinal direction of the vehicle is attached to both side portions of the undersurface of the seat frame 32. The front end portion of each seat rail 33 is attached to the seat bracket 30, and the rear end portion of each seat rail 33 is attached to the seat bracket 31, whereby the front seat 20 is fixed to the floor panel 1.

The floor tunnel 22 continuously forms a center console 23 from a first horizontal portion 39a near the feet of the occupants sitting in the front seats 20, and is provided with a first inclined face 34 that rises from the first horizontal portion 39a toward the rear upward, and a first top wall portion 35 that extends horizontally at the upper edge position of the seat cushion 20C is formed to be continuous with the first inclined face 34. Here, the height of the first top wall portion 35 is set to be nearly the same height as the upper edge of the seat cushion 20C. The center console 23 forms a second inclined face 36 at a position higher than a seating surface Z of the seat cushion 20C, is furthermore continuous with a horizontal second top wall portion 37 that crosses the seat back 20B in the fore-aft direction, descends rearward after this second top wall portion 37, and continues into a second horizontal portion 39b of the floor tunnel 22 that is formed at a position somewhat lower than the portion 35. In the drawings, reference numeral 38 denotes an indentation. That is, the front end and rear end of the center console 23 are continuous with the floor tunnel 22.

The seat cushion 20C is disposed so as to overlap the arrangement position of the fuel cell stack 12 when viewed from the side. Also, the portion 37 is disposed at a position extending from the front surface to the rear surface of the seat back 20B.

The fuel cell stack 12 is disposed from the portion 35 to the portion 37 of the center console 23. The oxygen system components 19a and the hydrogen system components 19b among the auxiliary components 19 are disposed at a site from the rear portion of the remaining second top wall portion 37 to the portion 39b of the floor tunnel 22. Here, directly below the portion 37, a space 53 is formed above the fuel cell stack 12 and the components 19b. The ECU 19c and a hydrogen sensor of the fuel cell stack 12 are disposed here. An arm rest 54 is disposed on the upper portion of the center console 23 above the rear half portion of the portion 35, the upper part of the second inclined face 36 and the portion 37 at a position covering them.

The fuel cell stack 12 is one having a structure in which a plurality of unit cells (unit fuel cells) are stacked along the longitudinal direction of the vehicle. Metal end plates 12FE and 12RE are attached at the front end portion and the rear end portion which are ends in the stacked direction, with the stacked unit cells sandwiched and fixedly fastened by these end plates 12FE and 12RE. Accordingly, the fuel cell stack 12 is disposed so as to be substantially parallel with the seat rails 33 disposed in the longitudinal direction of the vehicle. The seat rails 33 are disposed near the center in the vertical direction of the fuel cell stack 12, that is, at nearly the same height as the center of gravity G of the fuel cell stack 12 (see FIG. 6), with the front side of the seat rails 33 tilted slightly upward.

Also, the rear end plate 12RE, which is an end portion of the fuel cell stack 12 in the stacked direction, is disposed in the extended range of the seat rails 33, with the rear end of the seat rails 33 and the end plate 12RE positioned to overlap when viewed from the side. The dashed line shows the front end movement position of the seat rails 33, at which time the front end of the seat rails 33 overlaps the front end plate 12FE, which is an end portion of the fuel cell stack 12 in the stacked direction, when viewed from the side.

Reinforcement frames 55 that extend in the vehicle longitudinal direction along the stacked layers of unit cells of the fuel cell stack 12 are provided on the inside surface of both side walls 25 of the floor tunnel 22. The reinforcement frames 55 extend from the lower part of the front end portion of the first inclined face 34 of the center console 23 to the lower part of the front end portion of the second horizontal portion 39b of the floor tunnel 22. This reinforcement frames 55 are formed with a panel material 56 on the inside surface of the side walls 25 of the floor tunnel 22. Specifically, a pair of beadings 57 are provided that extend in the longitudinal direction of the vehicle, spaced vertically at a specified interval in the panel material 56. The reinforcement frames 55 include two closed section structures is formed between this beading 57 and the inside surface of each side wall 25 of the floor tunnel 22. The middle of the reinforcement frame 55 in the vertical direction is disposed at a position higher than the center of gravity G of the fuel cell stack 12. Specifically, the middle of the lower closed section structure in the reinforcement frame 55 is set to nearly the same height as the first horizontal portion 39a of the floor tunnel 22, and the middle of the upper closed section structure is set to nearly the same height as the second horizontal portion 39b of the floor tunnel 22 (that is, the bottom of the indentation 38).

A front stiffener 58 for reinforcement is disposed at a position including the first horizontal portion 39a and the front end portion of the first inclined face 34, so as to cover the upper portion of the side wall 25 from an upper wall 23U of the center console 23 and overlap the front end portion of the reinforcement frames 55. Also, a rear stiffener 59 for reinforcement is disposed at the second horizontal portion 39b so as to cover the upper portion of the side wall from the upper wall of the floor tunnel 22 and overlap the rear end portion of the reinforcement frames 55.

A top reinforcement 60 for reinforcement purposes that covers the upper portion of the side wall 25 from an upper wall 23U of the center console 23 is disposed at a position including the rear end portion of the first top wall portion 35, the second inclined face 36, the second top wall portion 37, and short of the second horizontal portion 39b. This top reinforcement 60 is attached in a state of being spaced at a specified interval with the second inclined face 36, forming a cross member portion 61 with a closed sectional structure that extends in the vehicle width direction under the floor tunnel 22 so as to connect the side walls 25 of the floor tunnel 22. Also, on the top reinforcement 60 are formed a pair of beadings 62 that extend in the vehicle width direction, whereby a cross beading 63 is formed including two closed section structures that extend in the vehicle width direction between the beading 62 and the floor tunnel 22 so as to connect the side walls 25 of the floor tunnel 22. The cross beading 63 is at a position higher than the seating surface Z of the seat cushion 20C, and is disposed at the side of the seat back 20B so as to overlap a side surface 20S of the seat back 20B of the front seat 20 when viewed from the side. Also, the position of the cross beading 63 is offset to the rear of the fuel cell stack 12 when viewed from the side.

According to the above embodiment, as shown in FIG. 7, in the event of the vehicle having a side impact collision so that an input load acts from the side of the vehicle (shown by the direction of the arrow), when this load acts on the right front seat 20, the whole of the seat frame 32 of the right front seat 20 shifts toward the middle in the vehicle width direction, thereby pressing the right-side side wall 25 of the floor tunnel 22. However, the pressing force that acts on this side wall 25 is received by the cross beading 63 and the cross member portion 61, with the side wall 25 not buckling since the closed sectional structure of the cross beading 63 and the cross member portion 61 is advantageous strengthwise with respect to buckling. The force is then transmitted so as to press the left-side side wall 25 of the floor tunnel 22, and additionally acts on the left front seat 20.

Accordingly, the fuel cell stack 12 is disposed outside of the vehicle cabin under the floor panel 1 while positioned between the front seats 20 in the vehicle cabin to be above the floor level and so is thereby isolated from the space for the occupants. Also, the floor tunnel 22 is effectively utilized as a member for protecting the fuel cell stack 12.

In the event of a side impact collision, the floor tunnel 22 acts to distribute the impact force to the left and right front seats 20, and thereby can reliably protect the fuel cell stack 12 by reducing the load that directly acts on the fuel cell stack 12.

In particular, the cross beading 63 is disposed at a higher position than the seating surface Z of the seat cushion 20C. Because of that, when a load acts from the side surfaces 20S of the seat backs 20B that flank the cross beading 63, a moment acts on the front seats 20 whose lower part is supported so that they fall toward the inside of the vehicle cabin. This moment can be received by the cross beading 63 at a mechanically advantageous high position, and the load can be reduced the longer the arm of the moment. As a result, the cross beading 63 can receive the impact force during a side impact on the vehicle in a strengthwise effective buckling direction and with a small load. Also, by making the cross beading 63 small, an increase in the vehicle weight can be suppressed to a minimum.

Since the cross beading 63 is disposed at a position corresponding to the side surfaces 20S, the load that acts during a side impact collision into the vehicle reliably acts from one front seat 20 onto the cross beading 63. Moreover, it reliably acts from this cross beading 63 onto the other front seat 20 via the seat back 20B thereof. Thereby, in the event of an impact force acting from either left or right, by transmitting the load with the left and right front seats 20, the fuel cell stack 12 can be reliably protected.

Also, in the event of a side impact into the vehicle, even when an excessive impact force acts on one front seat 20 from the vehicle body side portion causing the cross beading 63 to buckle, since the fuel cell stack 12 is not located to the side of the disposal region of the cross beading 63, no damage is caused to the fuel cell stack 12.

Moreover, since the reinforcement frames 55 are provided on the inside surface of the side walls 25, extending along the stacked layers of unit cells in the longitudinal direction of the vehicle, even when the seat frame 32 locally presses against the right-side side wall of the floor tunnel 22, the pressing force can be distributed along the entire length of the reinforcement frame 55, and so the strength of the floor tunnel 22 can be increased. In particular, since the reinforcement frame 55 forms a closed structure between the inside surface of the floor tunnel 22 by providing the beading 57, it is advantageous in terms of strength.

As a result, the floor tunnel 22 is hindered from deforming in the event of a side impact into the vehicle. This reduces the load that acts on the fuel cell stack 12 and so can reliably protect the fuel cell stack 12.

Also, even if by some chance the side wall 25 of the floor tunnel 22 caves in due to an excessively large input load during a side impact to the vehicle, due to the deformation of the portions where the reinforcement frame 55 is not provided, the reinforcement frame 55 impacts the fuel cell stack 12 by parallel displacement without deforming. At this time, since the reinforcement frame is disposed along the stacked layers of unit cells of the fuel cell stack 12, the load can be dispersed by the reinforcement frame 55 impacting along the entire length of the fuel cell stack 12. The fuel cell stack 12 can therefore be reliably protected by preventing load concentrations.

Moreover, since the reinforcement frame 55 is disposed along the stack layers in which a plurality of unit cells are stacked along the longitudinal direction of the vehicle, local damage such as a portion of the plurality of unit cells shifting in the vehicle width direction can be prevented, and so the fuel cell stack 12 can be protected.

Moreover, when the right-side seat rail 33 impacts the fuel cell stack 12 via the side wall 25 of the floor tunnel 22 due to an excessively large input load during a side impact into the vehicle, since the fuel cell stack 12 and the seat rail 33 are disposed nearly parallel, the entire length of the seat rail 33 impacts the fuel cell stack 12 while maintaining the parallel state. Accordingly, since a portion of the seat rail 33 does not locally impact the fuel cell stack 12, local damage to the fuel cell stack 12 can be prevented. Also, because the rear end of the seat rail 33 and the rear end plate 12RE of the fuel cell stack 12 are positioned to overlap when viewed from the side, even when the entire length of the seat rail 33 impacts the fuel cell stack 12, since the rear end of the seat rail 33 impacts the end plate 12RE, most of the load can be received by the end plate 12RE, which is a member having high strength. Accordingly, the seat rail 33 can be prevented from damaging the unit cells of the fuel cell stack 12, and as a result, the fuel cell stack 12 can be reliably protected. Also, since the seat rail 33 is positioned at nearly the same height as the center of gravity G of the fuel cell stack 12, when the seat rail 33 impacts the fuel cell stack 12, generation of a moment that rotates the fuel cell stack 12 is hindered, and so the fuel cell stack 12 can be reliably protected.

Also, since the reinforcement frames 55 are set to nearly the same height as the first horizontal portion 39a of the floor tunnel 22, which is the front end of the center console 23, and the second horizontal portion 39b of the floor tunnel 22, which is the rear end of the center console 23, the front end portion of the reinforcement frame 55 overlaps the front stiffener 58 provided at the first horizontal portion 39a, and the rear end portion of the reinforcement frame 55 overlaps the rear stiffener 59 provided at the second horizontal portion 39b, in the event of a frontal impact or rear impact into the vehicle, the reinforcement frame 55 reinforces the strength of the floor tunnel 22 in the vehicle horizontal direction. Thereby it can reliably protect the fuel cell stack 12 by preventing breakage of the floor tunnel 22 in the vehicle width direction.

Accordingly, the fuel cell stack 12 is isolated from the space for the occupants by being positionally disposed outside of the vehicle cabin under the floor panel 1 while positioned between the front seats 20 in the vehicle cabin to be above the floor level. Also, the floor tunnel 22 is effectively utilized as a member for protecting the fuel cell stack 12. Therefore, in the event of vehicle collision, the fuel cell stack 12 can be reliably protected.

The present invention is not limited to the aforementioned embodiment. For example, as long as the side walls 25 of the floor tunnel 22 are connected, the cross member portion 61 may be provided on the undersurface of the second top wall portion 37 of the center console 23, and the cross member portion 61 may also be a tension member that directly couples the side walls 25 of the floor tunnel 22 below the upper wall 23U of the center console 23.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell vehicle, comprising:
   a vehicle body;
   a floor panel provided in the vehicle body that has a floor tunnel, the floor tunnel upwardly extending relative to other portions of the floor panel and being disposed in substantially a center in a width direction of the vehicle body;
   a pair of front seats each having a seating surface and a seat back and disposed on the floor panel laterally outside of the floor tunnel in the width direction of the vehicle body;
   seat rails provided between the front seats and the floor panel and adapted to be able to move the front seats in a longitudinal direction of the vehicle body; and
   a fuel cell stack having a plurality of unit fuel cells stacked in the longitudinal direction of the vehicle body, the fuel cell stack being received under the floor tunnel and substantially in the center of the vehicle body width direction so as to be substantially parallel with the seat rails and relatively between the front seats,
   wherein the fuel cell stack is entirely disposed within a movable range of the seat rails in the longitudinal direction of the vehicle body, so that both a front end and a rear end of the fuel cell stack overlap with the movable range of the seat rails when viewed from a longitudinal side of the vehicle.

2. A fuel cell vehicle according to claim 1, wherein the seat rails are disposed at substantially the same height as the center of gravity of the fuel cell stack.

3. A fuel cell vehicle according to claim 1, further comprising
   an end plate provided on one end of the fuel cell stack in the stacking direction,
   wherein the fuel cell stack is disposed so that the end plate and the seat rails overlap in the longitudinal direction.

4. A fuel cell vehicle according to claim 1, wherein a length of the fuel cell stack in the longitudinal direction of the vehicle body is longer than the length of the fuel cell stack in the width direction of the vehicle body.

5. A fuel cell vehicle according to claim 1, further comprising
   an auxiliary component of the fuel cell stack provided behind the fuel cell stack with respect to the vehicle body.

6. A fuel cell vehicle according to claim 1, wherein a front end portion of the seat rails is disposed to be higher than a rear end portion thereof.

7. A fuel cell vehicle according to claim 1, further comprising
   a reinforcement frame provided on a side surface of the floor tunnel.

8. A fuel cell vehicle according to claim 7, wherein the reinforcement frame is provided at substantially same height as the upper end of the side surface of the floor tunnel.

9. A fuel cell vehicle according to claim 1, further comprising
   a transmission member that couples the side surfaces of the floor tunnel in the width direction of the vehicle body.

10. A fuel cell vehicle according to claim 9, wherein the transmission member is provided at a higher position than the seating surface.

11. A fuel cell vehicle according to claim 9, wherein the transmission member is provided at a side of each of the seat back.

12. A fuel cell vehicle according to claim 9, wherein transmission member is disposed at a rearward position of the fuel cell stack.

13. A fuel cell vehicle according to claim 9, wherein a cross beading is used as the transmission member.

14. A fuel cell vehicle according to claim 9, wherein the floor tunnel has a shape that is highest at the sides of the seat backs, and the transmission member is provided on top of the floor tunnel at sides of the seat backs.

15. A fuel cell vehicle according to claim 11, wherein the floor tunnel has a shape in which a portion positioned to the side of the seat backs is the highest.

16. A fuel cell vehicle, comprising:
    a vehicle body;
    a floor panel provided in the vehicle body that has a floor tunnel, the floor tunnel upwardly extending relative to other portions of the floor panel and being disposed in substantially a center in a width direction of the vehicle body;
    a pair of front seats each having a seating surface and a seat back and disposed on the floor panel laterally outside of the floor tunnel in the width direction of the vehicle body;
    seat rails provided between the front seats and the floor panel and constituted to be able to move the front seats in a longitudinal direction of the vehicle body;
    a transmission member that connects side surfaces of the floor tunnel in the width direction of the vehicle body; and
    a fuel cell stack having a plurality of unit fuel cells stacked in the longitudinal direction of the vehicle body, the fuel cell stack being received under the floor tunnel and substantially in the center of the vehicle body width direction so as to be substantially parallel with the seat rails and relatively between the front seats,
    wherein the fuel cell stack is entirely disposed within a movable range of the seat rails in the longitudinal direction of the vehicle body, so that both a front end and a rear end of the fuel cell stack overlap with the movable range of the seat rails when viewed from a longitudinal side of the vehicle.

17. A fuel cell vehicle, comprising:
    a vehicle body;
    a floor panel provided in the vehicle body that has a floor tunnel, the floor tunnel upwardly extending relative to other portions of the floor panel and being disposed in substantially a center in a width direction of the vehicle body;
    a pair of front seats each having a seating surface and a seat back and disposed on the floor panel laterally outside of the floor tunnel in the width direction of the vehicle body;
    seat rails provided between the front seats and the floor panel and constituted to be able to move the front seats in a longitudinal direction of the vehicle body;
    a reinforcement frame provided on side surfaces of the floor tunnel; and
    a fuel cell stack having a plurality of unit fuel cells stacked in the longitudinal direction of the vehicle body, being disposed under the floor tunnel,
    a fuel cell stack having a plurality of unit fuel cells stacked in the longitudinal direction of the vehicle body, the fuel cell stack being received under the floor tunnel and substantially in the center of the vehicle body width direction so as to be substantially parallel with the seat rails and relatively between the front seats,
wherein the fuel cell stack is entirely disposed within a movable range of the seat rails in the longitudinal direction of the vehicle body, so that both a front end and a rear end of the fuel cell stack overlap with the movable range of the seat rails when viewed from a longitudinal side of the vehicle.

* * * * *